US009212238B2

(12) United States Patent
Chang et al.

(10) Patent No.: US 9,212,238 B2
(45) Date of Patent: Dec. 15, 2015

(54) MICROPARTICLE, ADDITION AGENT AND FILTERING MEMBRANE

(71) Applicant: INDUSTRIAL TECHNOLOGY RESEARCH INSTITUTE, Hsinchu (TW)

(72) Inventors: Kuei-Chien Chang, Zhongli (TW); Chun-Yu Hsu, Minxiong Township, Chiayi County (TW)

(73) Assignee: Industrial Technology Research Institute, Hsinchu (TW)

( * ) Notice: Subject to any disclaimer, the term of this patent is extended or adjusted under 35 U.S.C. 154(b) by 225 days.

(21) Appl. No.: 14/022,742

(22) Filed: Sep. 10, 2013

(65) Prior Publication Data

US 2014/0186601 A1   Jul. 3, 2014

(30) Foreign Application Priority Data

Dec. 28, 2012   (TW) .............................. 101150900 A

(51) Int. Cl.
| | |
|---|---|
| *C08F 28/02* | (2006.01) |
| *B01D 67/00* | (2006.01) |
| *B01D 69/12* | (2006.01) |
| *B01D 69/14* | (2006.01) |
| *C02F 1/44* | (2006.01) |
| *B01D 61/02* | (2006.01) |
| *B01D 71/38* | (2006.01) |
| *B01D 71/56* | (2006.01) |
| *B01D 71/60* | (2006.01) |
| *B01D 71/76* | (2006.01) |

(52) U.S. Cl.
CPC ............ *C08F 28/02* (2013.01); *B01D 67/0006* (2013.01); *B01D 69/125* (2013.01); *B01D 69/141* (2013.01); *B01D 61/02* (2013.01); *B01D 71/38* (2013.01); *B01D 71/56* (2013.01); *B01D 71/60* (2013.01); *B01D 71/76* (2013.01); *C02F 1/44* (2013.01); *Y10T 428/2982* (2015.01)

(58) Field of Classification Search
CPC .. B01D 71/44; B01D 67/0006; B01D 69/125; B01D 69/141; C08F 28/02; C02F 1/44; Y10T 428/2982
USPC ................ 428/220, 402; 526/287; 525/328.5; 252/500
See application file for complete search history.

(56) References Cited

U.S. PATENT DOCUMENTS

| | | | |
|---|---|---|---|
| 4,277,344 A | 7/1981 | Cadotte | |
| 4,769,148 A | 9/1988 | Fibiger et al. | |
| 5,137,633 A | 8/1992 | Wang | |
| 5,658,460 A | 8/1997 | Cadotte et al. | |
| 6,056,861 A * | 5/2000 | Fuhr et al. | 204/547 |
| 7,425,266 B2 | 9/2008 | Freeman et al. | |
| 7,993,524 B2 * | 8/2011 | Ratto et al. | 210/652 |
| 2003/0066796 A1 | 4/2003 | Agarwal | |
| 2008/0010873 A1 | 1/2008 | Crum | |
| 2009/0120874 A1 | 5/2009 | Jensen et al. | |
| 2009/0272692 A1 | 11/2009 | Kurth et al. | |
| 2009/0321355 A1 | 12/2009 | Ratto et al. | |
| 2010/0025330 A1 | 2/2010 | Ratto et al. | |
| 2010/0044902 A1 | 2/2010 | Ohara et al. | |
| 2012/0208086 A1 * | 8/2012 | Plieth et al. | 429/213 |

FOREIGN PATENT DOCUMENTS

| | | |
|---|---|---|
| CN | 1800341 A | 7/2006 |
| CN | 101036198 A | 9/2007 |
| CN | 101254417 A | 9/2008 |
| CN | 101254419 A | 9/2008 |
| CN | 101293183 A | 10/2008 |
| CN | 100450597 C | 1/2009 |
| CN | 101735471 A | 6/2010 |
| CN | 101735472 A | 6/2010 |
| CN | 101940883 A | 1/2011 |
| CN | 102114392 A | 7/2011 |
| CN | 102585082 A | 7/2012 |
| FR | 2810259 A1 | 12/2001 |
| JP | 05-317669 | 3/1993 |
| JP | 05-146654 | 6/1993 |
| KR | 20110007761 A | 1/2011 |
| TW | 201210680 A | 3/2012 |
| WO | WO-9711996 A2 | 10/1998 |
| WO | WO-9846672 A2 | 10/1998 |

OTHER PUBLICATIONS

Taiwanese Office Action dated Oct. 24, 2014, as issued in corresponding Taiwan Patent Application No. 101150900 (5 pages).
Taiwanese Office Action dated Jul. 20, 2015, as issued in corresponding Taiwan Patent Application No. 101150900 (6 pages).

* cited by examiner

*Primary Examiner* — Leszek Kiliman
(74) *Attorney, Agent, or Firm* — Muncy, Geissler, Olds & Lowe, P.C.

(57) ABSTRACT

Provided is an electronic microparticle, including a first copolymer copolymerized from a first monomer and a second monomer or a second copolymer copolymerized from the first monomer, the second monomer and a third monomer. The first monomer includes an alkenyl group and excludes a sulfonic group, a carboxylic group, a hydroxyl group and an amino group. The second monomer includes an alkenyl group and further includes a sulfonic group or a carboxylic group. The third monomer includes an alkenyl group and further includes a hydroxyl group or an amino group. Either the first monomer or the second monomer has a ratio of the repeating units of the first monomer to the repeating units of the second monomer between about 200:1 and 20:1. In addition, an addition agent and a filtering membrane which include the electronic microparticle illustrated above are provided.

19 Claims, 6 Drawing Sheets

100

Providing an aqueous solution containing a first monomer and a second monomer, wherein the first monomer includes an alkenyl group and excludes a carboxyl group, a sulfonic group, a hydroxyl group or an amino group, and the second monomer includes an alkenyl group and further includes a carboxyl group or a sulfonic group —102

Heating the aqueous solution to a boiling state —104

Adding an initiator to the aqueous solution with thorough stirring for hours —106

Providing an aqueous solution containing a first monomer and a second monomer, wherein the first monomer includes an alkenyl group and excludes a carboxyl group, a sulfonic group, a hydroxyl group or an amino group, and the second monomer includes an alkenyl group and further includes a carboxyl group or a sulfonic group —202

Heating the aqueous solution to a boiling state —204

Adding an initiator to the aqueous solution with thorough stirring for hours —206

Adding a third monomer to the aqueous solution with though stirring for hours, wherein the third monomer includes an alkenyl group and further includes a hydroxyl group or an amino group —208

FIG. 2

MICROPARTICLE, ADDITION AGENT AND FILTERING MEMBRANE

CROSS REFERENCE TO RELATED APPLICATION

All related applications are incorporated by reference. The present application is based on, and claims priority from, Taiwan (International) Application Serial No. 101150900, filed on Dec. 28, 2012, the disclosure of which is hereby incorporated by reference herein in its entirety.

TECHNICAL FIELD

The present disclosure relates to a filtering membrane; in particular it relates to a filtering membrane containing an electronic microparticle.

BACKGROUND

In recent usage, filtering membranes are widely used in daily life for removing impurities in water. The filtering membranes are usually a porous polymer membrane having tiny pores. Solid impurities are intercepted by the tiny pores when a liquid passes through, amid therefore only a purified liquid can pass through the filtering membrane. For example, water filtered by a reverse-osmosis membrane or a nano-sized membrane can be used directly as drinking water or pure water for industrial use.

In typical applications, either the reverse-osmosis membrane or the nano-sized membrane is formed of a plurality layers with a dense-selective layer coated on their surface. The dense-selective layer is usually formed by interface polymerization. In practice, a filtering membrane having a high interception ratio and a high flux can usually meet the user's requirements, no matter what fields the filtering membrane would be used in. Conventional methods for improving the characteristics of the filtering membrane include modifying the surface of the filtering membrane or adding hydrophilic inorganic addition agents (e.g., nanoparticles or nanotubes) to the filtering membrane. However, the modifying process is complicated and difficult to control. The inorganic addition agents are difficult to disperse uniformly in the filtering membrane because the inorganic addition agents are formed of inorganic materials and the filtering membrane is formed of organic polymers.

Thus, a novel addition agent which can effectively improve the flux and the retention ratio of a filtering membrane is needed.

SUMMARY

Provided is an electronic microparticle according to an embodiment of the present disclosure. The electronic microparticle includes: a first copolymer polymerized from a first monomer and a second monomer or a second copolymer polymerized from the first monomer, the second monomer and a third monomer, wherein the first monomer includes an alkenyl group and excludes a carboxyl group, a sulfonic group, a hydroxyl group and an amino group, the second monomer includes an alkenyl group and further includes a carboxyl group or a sulfonic group, and the third monomer includes an alkenyl group and further includes a hydroxyl group or an amino group, wherein either the first copolymer or the second copolymer has a ratio of the repeat units of the first monomer to the repeating units of the second monomer between 200:1 and 20:1.

Provided is an addition agent according to an embodiment of the present disclosure. The addition agent includes the electronic microparticle illustrated above; and a polymer assistance, wherein the polymer assistance is poly(allylamine), polyglycols or a combination thereof and has a weight average molecular weight of between 100 and 100000.

Provided is a filtering membrane according to an embodiment of the present disclosure. The filtering membrane includes: a copolymer membrane copolymerized from (i) an oil phase monomer including a plurality of acyl halide groups, (ii) a water phase monomer comprising an amino group and (iii) the polymer assistance illustrated above, wherein the repeat units of the oil phase monomer and the repeat units of the water phase monomer are bonded to each other by an amide bond, and polymer assistance and the repeat units of the oil phase monomer are bonded to each other by an amide bond or an ester bond, and the electronic microparticles illustrated above are dispersed in the copolymer membrane.

BRIEF DESCRIPTION OF DRAWINGS

The disclosure will now be described, by way of example, with reference to the accompanying drawings, in which:

FIG. 1 is a flow chart of a method for forming an electronic microparticle according to an embodiment of the present disclosure;

FIG. 2 is a flow chart of a method for forming an electronic microparticle according to another embodiment of the present disclosure;

DETAILED DESCRIPTION

Figure 3:
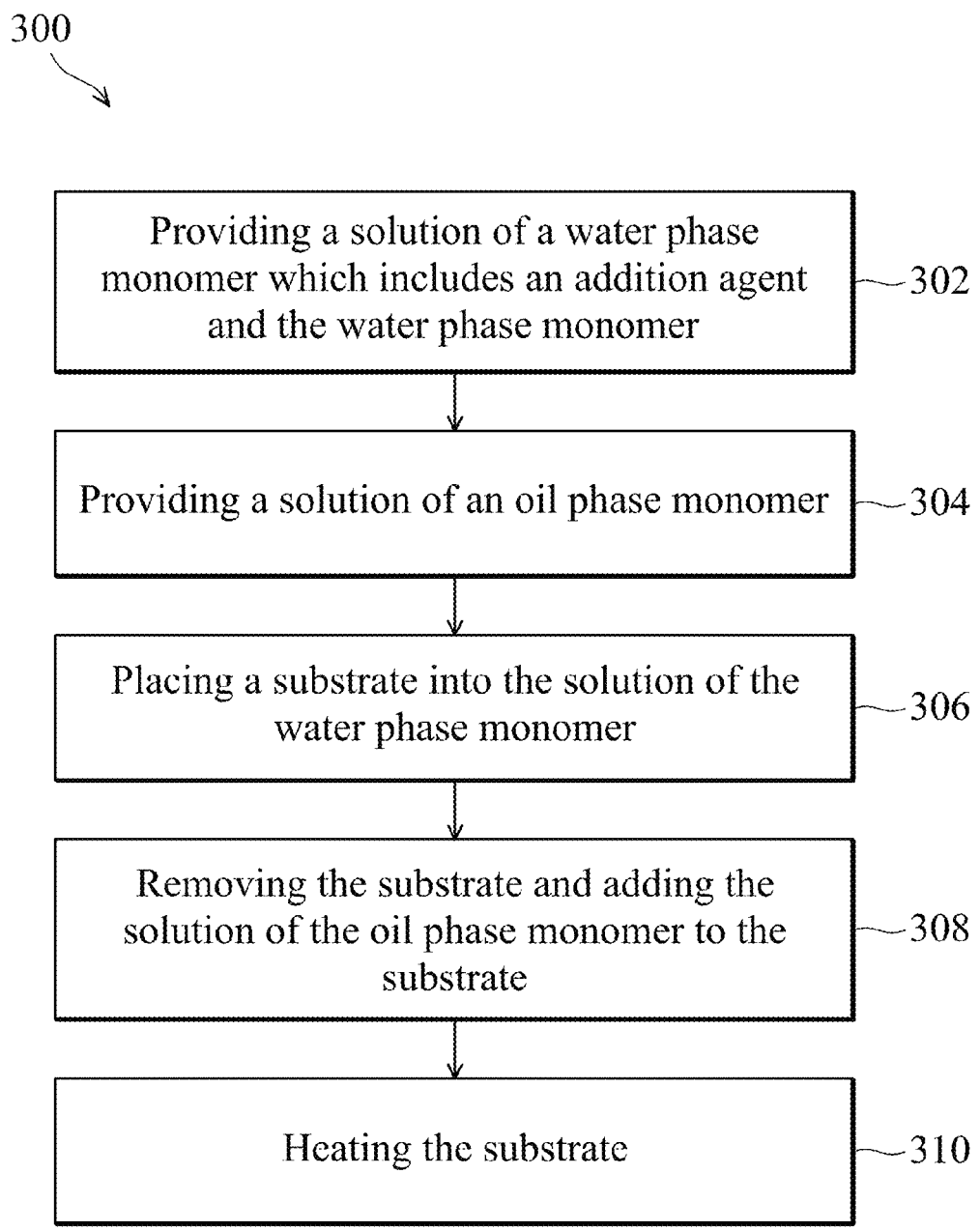
FIG. 3 is a flow chart of a method for forming a filtering membrane according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are shown schematically in order to simplify the drawing.

A hydrophilic electronic microparticle, an addition agent comprising the hydrophilic electronic microparticle, and a filtering membrane comprising the addition agent are provided. By using the hydrophilic microparticle and the addition agent, the filtering membrane may have a high retention rate and a high flux.

FIG. 1 is a flow chart of a method 100 for forming a hydrophilic microparticle according to an embodiment of the present disclosure. The method 100 may begin at step 102. A first monomer and a second monomer are provided and added to water for forming an aqueous solution. The first monomer includes an alkenyl group and excludes a carboxyl group, a sulfonic group, a hydroxyl group and an amino group, and the second monomer comprises an alkenyl group and further comprises a carboxyl group or a sulfonic group. In an embodiment, a molar ratio of the first monomer to a second monomer may be about 200:1 to about 20:1. The first monomer may be such as styrene, its derivatives, or carboxylates or other compounds containing a vinyl group or propenyl group. For example, the first monomer may be styrene, methylstyrene, ethylstyrene, divinyl benzene, 1,3-butadiene, isopentadiene, 1,4-hexadiene, vinyl acetate, vinyl stearate, methacrylate, methyl methacrylate, butyl acrylate, 2-ethylhexyl acrylate, glycidyl methacrylate, lauryl acrylate, N,N-dimethylaminoethyl acrylate, vinyl chloride, 1,1-vinylidene chloride, vinyl bromide or a combination thereof. The second monomer may be sodium styrene sulfonate, potassium styrene sulfonate, itaconic acid, maleic acid, fumaric acid, acrylic acid, methacrylic acid, isoprenesulfonic acid, 2-acrylamide-2-methylpropanesulfonic acid, derivatives thereof, or a combination thereof.

Afterwards, in step 104, the aqueous solution of step 102 is heated to a boiling state. Afterwards, in step 106, a suitable amount of initiator is added to the boiling aqueous solution of step 104 and thoroughly mixed for several hours such that the first and the second monomers are polymerized. In an embodiment, the initiator may be potassium persulfate. An aqueous solution containing an electronic microparticle is obtained. In an embodiment, the electronic microparticle may have a particle size of between about 1 and about 100 nm. The electronic microparticle may be a sphere, a prolate spheroid or other balls having a spherical-like shape. The electronic microparticle may be a copolymer (hereinafter referred as to the first copolymer) copolymerized from the first monomer and the second monomer. The first copolymer may have a weight average molecular weight of between about 3000 and about 50000. The ratio of the repeating units of the first monomer of the first copolymer to the repeating units of the second monomer of the first copolymer is between about 200:1 and about 20:1. The first copolymer may at least carry a sulfonic group or a carboxylic group on its surface such that the first copolymer is hydrophilic and can disperse in water. The first copolymer may have a potential voltage of between about −1 mV and −100 mV. For example, in an embodiment in which styrene and sodium styrene sulfonate are used as the first monomer and the second monomer, respectively, the first copolymer may have the following chemical formula:

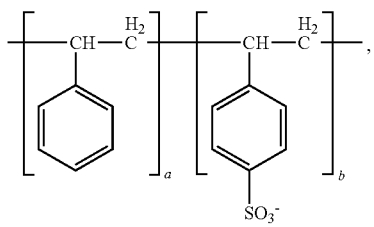

wherein a is 30 to 200, and b is 1 to 10.

FIG. 2 is a flow chart of a method 200 for forming a hydrophilic microparticle according to another embodiment of the present disclosure. In this embodiment, the hydrophilic microparticle is formed of a second copolymer. The second copolymer is copolymerized from the first monomer, the second monomer and a third monomer. Note that the first monomer and the second monomer can be the same as the first monomer and the second monomer described in the preceding embodiments. In an embodiment, the third monomer may comprise an alkenyl group and further comprise a hydroxyl group or an amino group.

The method 200 may begin at step 202, in which the first monomer and the second monomer are added to water for forming an aqueous solution. In an embodiment, a molar ratio of the first monomer to the second monomer may be about 20:1 to about 200:1.

Afterwards, in step 204, the aqueous solution of step 202 is heated to a boiling state. Afterwards, in step 206, a suitable amount of initiator (e.g., potassium persulfate) is added to the boiling aqueous solution of step 204 and stirred thoroughly for about 5 minutes to 5 hours, such that the first monomer and the second monomer are polymerized. In an embodiment, the initiator may be potassium persulfate, 4,4'-azobis(4-cyanovaleric acid), 2,2'-azobis[2-(2-imidazolin-2-yl)propane], 2,2'-azobis[2-(methylpropionamidine)dihydrochloride], 2,2'-azobis{2-[1-(2-hroxyethyl)-imidzolin-2-yl]propane}dihydrochloride, ammonium persulfate or a combination thereof.

Then, in step 208, a third monomer is slowly added to the boiling aqueous solution of step 206 and stirred thoroughly for 5 minutes to about 5 hours. In an embodiment, the third monomer may be hydroxyethyl methacrylate (HEMA), glycerol monomethacrylate, 2-hydroxyethyl acrylate (HEA), N-(2-hydroxypropyl)methacrylamide, hydroxypropyl methacrylate, allylamine, diallylamine, 2-aminoethyl methacrylate hydrochloride, N-(2-aminoethyl methacrylamide hydrochloride), N-(3-aminopropyl)methacrylamide hydrochloride, 2-(tert-butylamino)ethyl methacrylate, other compounds having an alkenyl group and capable of reacting with an acyl chloride group, or a combination thereof. A molar ratio of the third monomer and the second monomer may be about 1:10 to about 10:1.

An aqueous solution containing an electronic microparticle is obtained. The electronic microparticle may be a copolymer (hereinafter referred to as the second copolymer) copolymerized from the first copolymer, the second copolymer and the third copolymer. The second copolymer may have a weight average molecular weight of about 3000 to about 50000. The second copolymer may be a block copolymer. In addition, the ratio of the repeating units of the first monomer of the second copolymer to the repeating units of the second monomer of the second copolymer is between about 200:1 to about 20:1, and the ratio of the repeating units of the second monomer of the second copolymer to the repeating units of the third monomer of the second copolymer is between about 1:10 to about 10:1. The electronic microparticle may at least carry a sulfonic group and a hydroxyl group and therefore have a surface potential of between −1 and −100 mV, or between −30 and −70 mV. In addition, the electronic microparticle is hydrophilic and can disperse in water. In an embodiment, the electronic microparticle has an average particle size of between about 1 nm and about 100 nm. The electronic microparticle may have the shape of a sphere, a prolate spheroid or other balls having a spherical-like shape.

For example, in an embodiment in which styrene, sodium styrene sulfonate and hydroxyethyl methacrylate are used as the first monomer, the second monomer and the third monomer, the second copolymer have the following chemical formula:

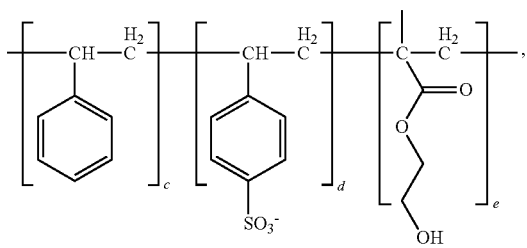

wherein c is 30 to 200, d is 1 to 10, and e is 1 to 10.

FIG. 3 is a flow chart of a method 300 for forming a filtering membrane according to an embodiment of the present disclosure. The method 300 may begin at step 302, in which a solution of a water phase monomer is provided. In this embodiment, the solution of the water phase monomer may comprise an addition agent and a water phase monomer dissolved in water. In an embodiment, the addition agent may comprise the electronic microparticle described in the preceding embodiments (such as the first copolymer and/or the second copolymer) and a polymer assistance. The polymer assistance may be a polymer containing a plurality of amino groups or hydroxyl groups. For example, the polymer assistance may be poly(allyamine), polyethylene, polypropylene, other polyglycols, or a combination thereof. Since both the electronic microparticle and polymer assistance are an organic polymer carrying hydrophilic groups, the addition agent is water soluble. In an embodiment, the weight ratio of the electronic microparticle and the polymer assistance of the addition agent is between about 0.1:1 and about 1:0.1.

The method 300 further comprises step 304, in which a solution of oil phase monomer is provided. In this embodiment, the solution of the oil phase monomer may comprise an oil phase monomer dissolved in an organic solvent. In an embodiment, the oil phase monomer may comprise a monomer containing a plurality of acyl halogen groups. For example, the oil phase monomer may be 1,3,5-trimesoyl chloride, 1,4-benzenedicarbonyl chloride, isophthaloyl dichloride or a combination thereof. The water phase monomer may be aromatic diamines or aliphatic diamines, such as p-phenylenediamine, m-phenylenediamine, 1,4-cyclohexanediamine, N,N-diphenylethylene diamine, piperazine, trimethylene dipiperidine, m-xylene diamine, carbonyl diamine, 5-methylnonane-1,9-diamine, 2,2'-(ethylenedioxy) bis(ethylamine) or a combination thereof. The organic, solvent may be any suitable organic solvents. It should be noted that the weight ratio of the oil phase monomer to the water phase monomer is between about 1:7 and about 1:135. In some embodiments, the weight ratio of the addition agent to the water phase agent is between about 1:20 and about 1:40.

Afterwards, in step 306, a substrate is provided and disposed the solution of the water phase monomer of step 302 such that the addition agent and the water phase monomer are absorbed on the surface of the substrate. Afterwards, in step 308, the substrate is removed from the solution of the water phase monomer, and the second solution is added to the surface of the substrate. The substrate is left to stand for 0.1 to 100 minutes for interface polymerization. Finally, in step 310, the substrate is heated to 30 to 100° C. for 0.1 to 2 hours. In an embodiment, the substrate may be washed by water and methanol before the substrate is heated, and then dried at room temperature.

Since the polymer assistance may function like a surfactant, the polymer assistance help the oil phase monomer and the water phase monomer to react at the interface between the oil phase and the water phase. In addition, the plurality of acyl halogen groups of the oil phase monomer may react with the amino or hydroxyl groups of the polymer assistance for forming amide bonds or ester bonds and may react with the amino groups of the water phase monomer for forming amide bonds. Thus, the polymer assistance, the repeating units of oil phase monomer and the repeating units of the water phase monomer are bonded to each other by amide bonds and/or ester bonds and form a copolymer (hereinafter referred as to a third copolymer). In an embodiment, the third copolymer may have a weight average molecular weight of about 2000 to 100000. In some embodiments, the filtering membrane may have a thickness of between 100 and 500 nm.

In addition, in an embodiment in which the electronic microparticle is formed of the first copolymer, the first copolymer is not covalently bonded to the third copolymer. Thus, the electronic microparticles are individually dispersed in the filtering membrane. In addition, in another embodiment in which the electronic microparticle is formed of the second copolymer, the hydroxyl groups or the amino groups of the second copolymer are bonded to the acyl halogen groups of the oil phase monomer and form ester bonds or amide bonds. Thus, the electronic microparticle may be formed as a portion the third copolymer.

For example, in an embodiment, the third copolymer may have a chemical formula as follows:

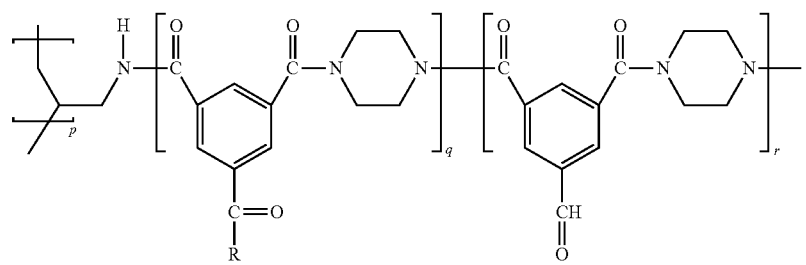

Figure 4:
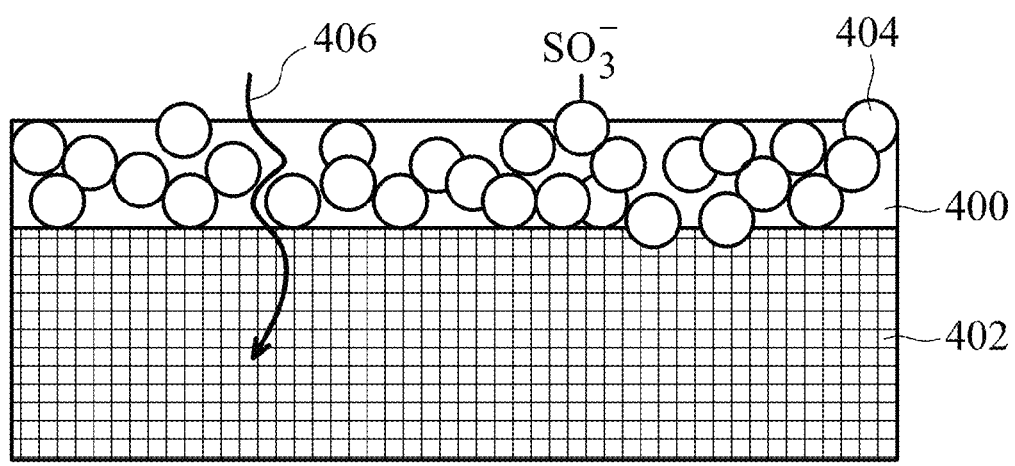
FIG. 4 shows a structural scheme of a filtering membrane formed according to the method shown in FIG. 3.

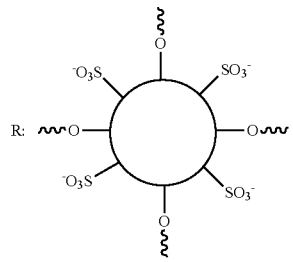

wherein p is 50 to 400, q is 1 to 10, r is 1 to 200, and R is the electronic microparticle FIG. 4 shows a structural scheme of the filtering membrane formed according to the method 300. The electronic microparticles 404 having a hydrophilic surface 402 and electronic properties are added to the filtering membrane 400. Accordingly, micro-channels 406 in the filtering membrane 400 are increased greatly. The flux and the retention rate to high valence ions are also increased.

Example 1

Preparation of the Electronic Microparticle 10 g of styrene, 0.4 g of sodium styrene sulfone and 85 g of water were added to a 250 ml reaction bottle and heated to a boiling state for 3 minutes with thorough stirring. Then, 0.0876 g of potassium persulfate was dissolved in 5 g of water and then added to the boiling solution with through stirring for 2 hours. The solution was left to stand for cooling, and an aqueous emulsion was obtained.

Then, 30 nil of the aqueous emulsion was added to a dialysis membrane (6-8000 Da molecular weight cutoff, 50 BIM flat width and 50 mm length), and then the dialysis membrane was sealed with a sealing clip. The sealed dialysis membrane was disposed in a beaker containing 1 L of deionic water therein after no leak of the aqueous emulsion has been confirmed. The deionic water was replaced every 12 hours for a period of 1 week. A clean aqueous solution containing an electronic microparticle formed of poly(styrene-co-sodium styrene sulfonate) was obtained. The electronic microparticle had a surface potential of −64.7 mV and an average particle size of 23 nm.

Example 2

10 g of styrene, 0.4 g of sodium styrene sulfone and 85 g of water were added to a 250 ml reaction bottle and heated to a boiling state for 3 minutes with thoroughly stirring. 0.0876 g of potassium persulfate was dissolved in 5 g of Water and then added to the boiling solution with through stirring for 2 hours. Then, 0.15 g of hydroxyethyl methacrylate (HEMA) was dissolved in 5 g of water and then added to the boiling solution with through stirring for 2 hours. The solution was left to stand for cooling, and an aqueous emulsion was obtained.

Then, 30 ml of the aqueous emulsion was added to a dialysis membrane (6-8000 Da molecular weight cutoff, 50 mm flat width and 50 mm length) and then the dialysis membrane was sealed using a sealing clip. The sealed dialysis membrane was disposed in a beaker containing 1 L of deionic water therein after no leak of the aqueous emulsion has been confirmed. The deionic water was replaced every 12 hours for a period of 1 week. A clean aqueous solution containing an electronic microparticle formed of styrene/sodium styrene sulfonate/HEMA terpolymer was obtained. The electronic microparticle had a surface potential of −46 mV and an average particle size of 24 nm.

Example 3

Preparation of the Filtering Membrane 0.2 g of the electronic microparticle of the Example 1, 8 g of p-phenylenediamine and 0.4 g of poly(allyamine) as added to 391.2 g of water for forming a solution of a water phase monomer. 1.2 g of 1,3,5-trimesoyl chloride was added to 598.8 g of hexane for forming a solution of an oil phase monomer. Afterwards, a polyethersulfone (PES) substrate was dipped into the solution of the water phase monomer for 10 mins. Then, the PES substrate was removed from the solution of the water phase monomer by scraping out the remaining water on the substrate. Then, 45.8 g of the solution of the oil phase monomer was added to the surface of the PES substrate. The PES substrate was left to stand for 1 minute. Then, hexane was removed, and the surface of the PES substrate was washed by water and methanol. The cleaned substrate was dried at room temperature for 3 minutes and then baked at 60° C. for 30 mins. A filtering membrane having a thickness of between 300 nm and 400 nm was obtained.

Example 4

The same procedure as in Example 3 was repeated for Example 4, except that the electronic microparticle of Example 1 was 0.4 g.

Example 5

The same procedure as in Example 3 was repeated for Example 5, except that the electronic microparticle of Example 1 was replaced with 0.2 g of the electronic microparticle of Example 2.

Example 6

The same procedure as in Example 3 was repeated for Example 6, except that the electronic microparticle of Example 1 was replaced with 0.4 g of the electronic microparticle of Example 2.

Example 7

The same procedure as in Example 3 was repeated for Example 7, except that the poly(allylamine) was replaced with 0.4 g of polyethylene, and the electronic microparticle of Example 1 was replaced with 0.2 g of the electronic microparticle of Example 2.

Example 8

The same procedure as in Example 7 was repeated for Example 8, except that the electronic microparticle of Example 2 was 0.4 g.

Comparison Example 1

The same procedure as in Example 3 was repeated for Comparison Example 1, except that the electronic microparticle of Example 1 and the poly(allylamine) were not added.

Comparison Example 2

The same procedure as in Example 3 was repeated for Comparison Example 2, except that the electronic microparticle of Example 1 was not added.

Comparison Example 3

The same procedure as in Example 3 was repeated for Comparison Example 3, except that the electronic microparticle of Example 1 was not added and the poly(allylamine) was 2 g.

Comparison Example 4

The same procedure as in Example 5 was repeated for Comparison Example 4; except that the poly(allylamine) was not added.

Comparison Example 5

The same procedure as in Example 6 was repeated for Comparison Example 5, except that the poly(allylamine) not added.

Figure 5:
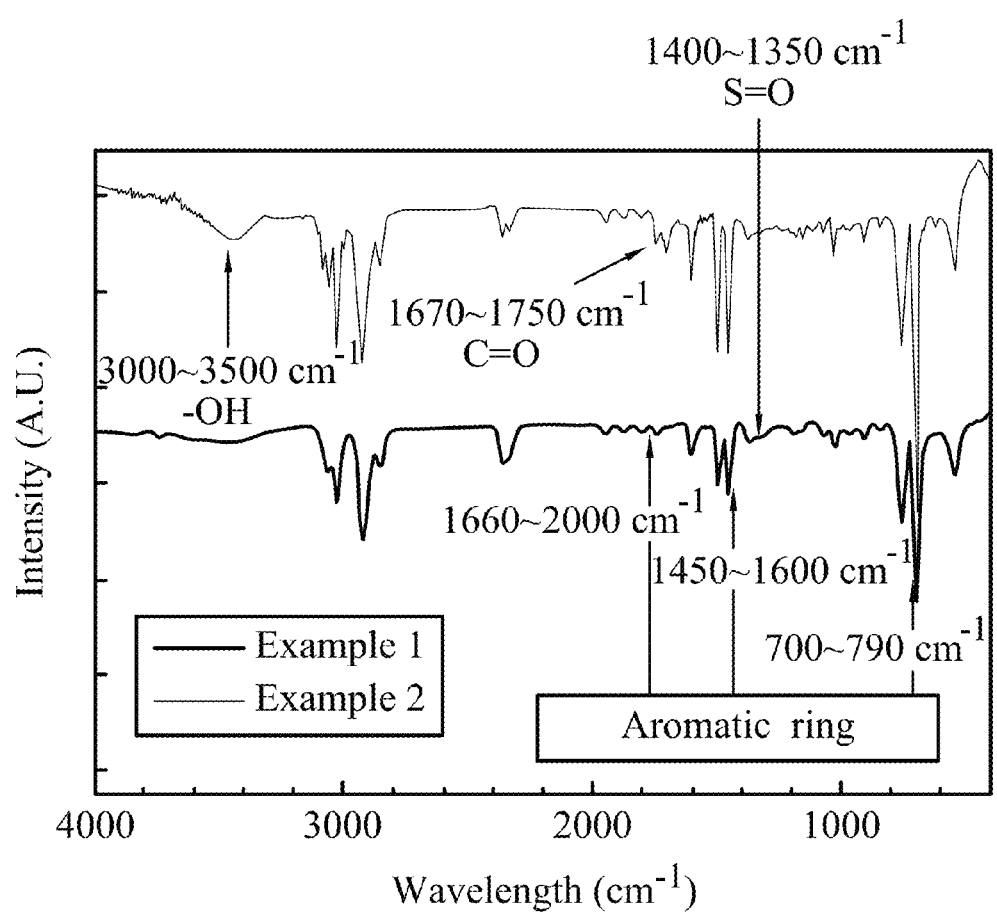
FIG. 5 shows a Fourier transform infrared spectrum of an electronic microparticle according to an embodiment of the present disclosure.

FIG. 5 shows Fourier transformation infrared spectra of the electronic microparticles of Examples 1 and 2 after drying. It can be seen from the spectra that both the electronic microparticles of Examples 1 and 2 have an absorption peak of an S=O group contained in the $SO^{3-}$ group at 1350-1400 $cm^{-1}$. The electronic microparticles of Examples 1 and 2 also both have absorption peaks of the benzyl group at 700-790 $cm^{-1}$, 1450-1500 $cm^{-1}$ and 1600-2000 $cm^{-1}$. Thus, it is proved that styrene was copolymerized with sodium styrene sulfonate. In addition, the electronic microparticle of Examples 2 further has an absorption peak of a C=O group at 1670-1740 $cm^{-1}$ and an absorption peak of a OH group at 3000-3500 $cm^{-1}$ when compared to the Example 1. Thus, it is proved that HEMA was copolymerized the styrene and/or sodium styrene sulfonate.

Figure 6:
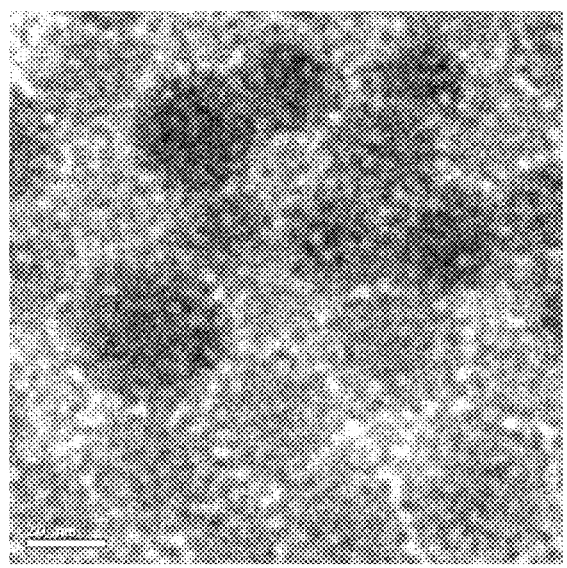
FIG. 6 shows a transmission electronic microscopy image according to an embodiment of the present disclosure.

FIG. 6 shows a TEM image of Example 2, in which clearly shows that the electronic microparticles are spheres having an average diameter of about 10 nm to about 100 nm.

The experiment data (not shown) also proves that the surface potential (measured in 0.001M of KCl aqueous solution) of the filtering membrane of Example 6 is greater than that of the commercial filtering membranes IF-90 and NF-270 (FilmTec Corp., Minneapolis, Minn.). It is because the filtering membrane had the electronic microparticles.

The filtering and desalination performance of Examples 3-8 and Comparison Examples 1-5 are summarized in Table 1. Table 1 was tested by introducing a 400 ppm $CaCl_2$ solution to the filtering membranes of Examples 3-8 and Comparison Examples 1-5 under 5 $Kg/m^2$. In the Table 1, the PIP was p-phenyldiamine; the PAA was poly(allylamine), the PEG was polyethylene, the HEMA was hydroxyethyl methacrylate; and the TMS was 1,3,5-trimesoyl chloride. The weight percents of the PIP, the polymer assistance and the electronic microparticle are the weight percents with respect to the total weight of the solution of the water phase monomer. The weight percent of the TMC is the weight percent with respect to the total weight of the solution of the oil phase monomer.

TABLE 1

| | water phase | | | | | oil phase | filtering performance | |
|---|---|---|---|---|---|---|---|---|
| | | polymer assistance | | electronic microparticle (wt %) | | | | |
| | PIP (wt %) | (wt %) | | including HEMA | without HEMA | TMC (wt %) | retention rate (%) | flux (L/m²-hr) |
| | | PAA | PEG | | | | | |
| Example 3 | 2 | 0.1 | — | 0.05 | — | 0.2 | 92.09 | 51 |
| Example 4 | 2 | 0.1 | — | 0.1 | — | 0.2 | 90.36 | 27 |
| Example 5 | 2 | 0.1 | — | — | 0.05 | 0.2 | 95.91 | 81 |
| Example 6 | 2 | 0.1 | — | — | 0.1 | 0.2 | 96.77 | 51 |
| Example 7 | 2 | — | 0.1 | — | 0.05 | 0.2 | 93.41 | 98.25 |
| Example 8 | 2 | — | 0.1 | — | 0.1 | 0.2 | 93.52 | 69 |
| Comparison Example 1 | 2 | — | — | — | — | 0.2 | 79.31 | 23.8 |
| Comparison Example 2 | 2 | 0.1 | — | — | — | 0.2 | 76.52 | 30 |
| Comparison Example 3 | 2 | 0.5 | — | — | — | 0.2 | 92.42 | 16.5 |
| Comparison Example 4 | 2 | — | — | — | 0.05 | 0.2 | 62.72 | 76.5 |
| Comparison Example 5 | 2 | — | — | — | 0.1 | 0.2 | 20.41 | 85.5 |
| NF-90 | — | — | — | — | — | — | >95 | 11.4 |
| NF-270 | — | — | — | — | — | — | 37 | 45.6 |

It can be seen from Table 1 that the filtering membranes of Examples 3-8 have better retention rate and flux because the addition agent (including the polymer assistance and the electronic microparticle) was added. For example, the retention rates of Examples 3-8 are greater than 90%, and are greater than that of Comparison Examples 1-5. In addition, the fluxes of Examples 3-8 are much higher than those of Comparison Examples 1-3 and the commercial filtering membranes NF-90 and NF-270. In addition, as shown in Comparison Examples 2-3, although the retention rate may be increased to higher than 70% when only adding the electronic microparticle, the flux does not increase. In addition, as shown in Comparison Examples 4-5, the retention rates are decreased. Furthermore, the retention rate and the flux may be both increased when the electronic microparticle containing HEMA because the HEMA can make the electronic microparticle more hydrophilic. In addition, good retention rates and flux can be also obtained when the polymer assistance was formed of polyethylene.

While the embodiments have been described above, it will be recognized and understood that various modifications can be made to the disclosure and the appended claims are intended to cover all such modifications which may fall within the spirit and scope of the disclosure.

What is claimed is:

1. An electronic microparticle, comprising:
   a first copolymer polymerized from a first monomer and a second monomer or a second copolymer polymerized from the first monomer, the second monomer and a third monomer, wherein the first monomer comprises an alkenyl group and excludes a carboxyl group, a sulfonic group, a hydroxyl group and an amino group, the second monomer comprises an alkenyl group and further comprises a carboxyl group or a sulfonic group, and the third monomer comprises an alkenyl group and further comprises a hydroxyl group or an amino group, wherein either the first copolymer or the second copolymer has a ratio of the repeat units of the first monomer to the repeating units of the second monomer between 200:1 and 20:1.

2. The electronic microparticle of claim 1, wherein the second monomer comprises sodium styrene sulfonate, potassium styrene sulfonate, acrylic acid, methacrylic acid, itaconic acid, maleic acid, fumaric acid, isoprenesulfonic acid, 2-acrylamide-2-methylpropanesulfonic acid, or a combination thereof.

3. The electronic microparticle of claim 1, wherein the first monomer comprises styrene, methylstyrene, ethylstyrene, divinyl benzene, 1,3-butadiene, isopentadiene, 1,4-hexadiene, vinyl acetate, vinyl stearate, methacrylate, methyl methacrylate, butyl acrylate, 2-ethylhexyl acrylate, glycidyl methacrylate, lauryl acrylate, N,N-dimethylaminoethyl acrylate, vinyl chloride, vinylidene chloride, vinyl bromide, or a combination thereof.

4. The electronic microparticle of claim 1, wherein the third monomer comprises hydroxyethyl methacrylate, glycerol monomethacrylate, 2-hydroxyethyl acrylate, N-(2-hydroxypropyl)methacrylamide, hydroxypropyl methacrylate, or a combination thereof.

5. The electronic microparticle of claim 1, wherein the first polymer is:

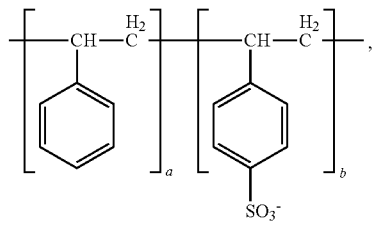

wherein a is 30 to 200, and b is 1 to 20.

6. The electronic microparticle of claim 1, wherein the second polymer is

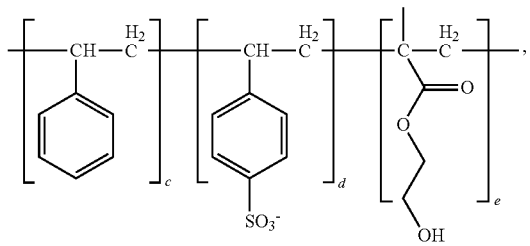

wherein c is 30 to 200, d is 1 to 20, and e is 1 to 20.

7. The electronic microparticle of claim 1, wherein the electronic microparticle has a particle size of between about 1 nm and about 100 nm.

8. The electronic microparticle of claim 1, wherein the electronic microparticle has a surface potential of about −1 mV to about −100 mV.

9. An addition agent, comprising:
   the electronic microparticle of claim 1; and
   a polymer assistance, wherein the polymer assistance is poly(allylamine), polyglycols or a combination thereof and has a weight average molecular weight of between 100 and 100000.

10. The addition agent of claim 9, wherein the electronic microparticle and the polymer assistance are water soluble.

11. The addition agent of claim 9, wherein the weight ratio of the electronic microparticle to the polymer assistance is about 0.1:1 to 1:0.1.

12. A filtering membrane, comprising:
    a copolymer membrane copolymerized from (i) an oil phase monomer including a plurality of acyl halide groups, (ii) a water phase monomer comprising an amino group and (iii) the polymer assistance of claim 9, wherein the repeat units of the oil phase monomer and the repeat units of the water phase monomer are bonded to each other by an amide bond, and polymer assistance and the repeat units of the oil phase monomer are bonded to each other by an amide bond or an ester bond, and
    the electronic microparticles of claim 1 dispersed in the copolymer membrane.

13. The filtering membrane of claim 12, wherein the electronic microparticles is 0.1 wt % to 20 wt % of the total weight of the filtering membrane.

14. The filtering membrane of claim 12, wherein the electronic microparticles are dispersed in the copolymer membrane individually when the electronic microparticles are formed of the first copolymer.

15. The filtering membrane of claim 12, wherein the electronic microparticles are covalently bonded to the copolymer membrane when the electronic microparticles are formed of the second copolymer.

16. The filtering membrane of claim 12, wherein the oil phase monomer comprises trimesoyl chloride, 1,4-benzenedicarbonyl chloride, isophthaloyl dichloride or a combination thereof.

17. The filtering membrane of claim 12, wherein the water phase monomer comprises p-phenylenediamine, m-phenylenediamine, 1,4-cyclohexanediamine, N,N-diphenylethylene diamine, trimethyl dipiperidine, m-xylene, carbonyl diamine, 5-methylnonane-1,9-diamine, 2,2'-(ethylenedioxy) bis(ethylamine) or a combination thereof.

18. The filtering membrane of claim 12, wherein the electronic microparticle has a particle size of between 1 and 100 nm and a surface potential of between about −1 and −100 mV.

19. The filtering membrane of claim 12, wherein the filtering membrane has a thickness of between about 100 and 500 nm.

* * * * *